(12) United States Patent
Nagasaki (10) Patent No.: US 11,379,701 B2
(45) Date of Patent: Jul. 5, 2022

(54) SERVER AND NON-TRANSITORY COMPUTER-READABLE STORAGE MEDIUM STORING CONTROL PROGRAM

(71) Applicant: BROTHER KOGYO KABUSHIKI KAISHA, Nagoya (JP)

(72) Inventor: Takeshi Nagasaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 668 days.

(21) Appl. No.: 15/798,636

(22) Filed: Oct. 31, 2017

(65) Prior Publication Data

US 2018/0157942 A1 Jun. 7, 2018

(30) Foreign Application Priority Data

Dec. 1, 2016 (JP) .............................. JP2016-233804
Dec. 21, 2016 (JP) .............................. JP2016-247822

(51) Int. Cl.
*G06K 15/00* (2006.01)
*B41J 2/175* (2006.01)
(Continued)

(52) U.S. Cl.
CPC ........ *G06K 15/402* (2013.01); *B41J 2/17546* (2013.01); *G03G 15/553* (2013.01);
(Continued)

(58) Field of Classification Search
CPC . G06K 15/402; G06K 15/102; B41J 2/17546; G03G 15/553; G03G 15/0863; G06F 21/00; G06F 21/31; H04L 67/28
(Continued)

(56) References Cited

U.S. PATENT DOCUMENTS

2003/0182367 A1* 9/2003 Ohara .................... G06F 3/1204
709/203
2004/0073684 A1* 4/2004 Jodra .................. H04N 1/00244
709/228
(Continued)

FOREIGN PATENT DOCUMENTS

CN  103412730 A  11/2013
CN  104249558 A  12/2014
(Continued)

OTHER PUBLICATIONS

Extended European Search Report dated Apr. 18, 2018 received in related application EP 17200416.0.
(Continued)

*Primary Examiner* — Patrick Mcatee
*Assistant Examiner* — Zesheng Xiao
(74) *Attorney, Agent, or Firm* — Scully Scott Murphy and Presser (57) ABSTRACT

A server registers a user ID for identifying a user and consumable component information corresponding to a consumable component selected by the user in a condition where a connection between the server and a device via the Internet has not been established. The server registers a device ID for identifying the device after the connection between the server and the device via the Internet has been established for the first time. In response to receiving related information related to the service, the server communicates with a service providing server using the user ID and the consumable component information.

13 Claims, 6 Drawing Sheets

(51) Int. Cl.
*G03G 15/00* (2006.01)
*G06F 21/00* (2013.01)
*G06F 21/31* (2013.01)
*G06K 15/10* (2006.01)
*H04L 67/56* (2022.01)
*G03G 15/08* (2006.01)

(52) U.S. Cl.
CPC .............. *G06F 21/00* (2013.01); *G06F 21/31* (2013.01); *H04L 67/28* (2013.01); *G03G 15/0863* (2013.01); *G06K 15/102* (2013.01)

(58) Field of Classification Search
USPC .......................................................... 705/72
See application file for complete search history.

(56) References Cited

U.S. PATENT DOCUMENTS

| | | | | |
|---|---|---|---|---|
| 2007/0233834 | A1* | 10/2007 | Hattori | G06F 3/1204 709/223 |
| 2008/0071626 | A1* | 3/2008 | Hill | G06Q 10/00 705/22 |
| 2008/0244043 | A1* | 10/2008 | Kawai | H04L 41/0846 709/221 |
| 2011/0234656 | A1 | 9/2011 | Mizutani et al. | |
| 2011/0238704 | A1* | 9/2011 | Koike | G06Q 10/087 707/802 |
| 2011/0239804 | A1 | 10/2011 | Hase et al. | |
| 2011/0276478 | A1* | 11/2011 | Hirson | G06Q 20/023 705/40 |
| 2012/0096399 | A1 | 4/2012 | Pangrazio, III | |
| 2013/0145221 | A1 | 6/2013 | Kaneko | |
| 2013/0247217 | A1* | 9/2013 | Junod | G06F 21/6218 726/27 |
| 2014/0227976 | A1 | 8/2014 | Callaghan et al. | |
| 2015/0002884 | A1 | 1/2015 | Okumura et al. | |
| 2015/0040187 | A1 | 2/2015 | Fujii | |
| 2016/0292550 | A1 | 10/2016 | Kawai | |

FOREIGN PATENT DOCUMENTS

| | | |
|---|---|---|
| JP | 2005-280067 A | 10/2005 |
| JP | 2011-198331 A | 10/2011 |
| JP | 2013-114654 A | 6/2013 |
| JP | 2016-193592 A | 11/2016 |

OTHER PUBLICATIONS

Notice of Reasons for Refusal dated Jun. 30, 2020 received in Japanese Patent Application No. JP 2016-247822 together with an English language translation.

First Office Action dated Aug. 20, 2021 received in Chinese Patent Application No. CN 201711236750.9 together with an English language translation.

* cited by examiner

Fig.1

Fig.3

SERVER AND NON-TRANSITORY COMPUTER-READABLE STORAGE MEDIUM STORING CONTROL PROGRAM

CROSS-REFERENCE TO RELATED APPLICATIONS

This application claims priority from Japanese Patent Application No. 2016-247822, filed on Dec. 21, 2016, which claims priority from Japanese Patent Application No. 2016-233804, filed on Dec. 1, 2016. The disclosures of these applications are incorporated herein by reference in their entirety.

TECHNICAL FIELD

The present disclosure relates to a server that is communicable to a device via the Internet.

BACKGROUND

Recently, there has been provided some service for a device offered using a service providing server, e.g., an electric commerce ("EC") server. Such service may include a consumable components automatic ordering service for the device. To obtain such service, for example, the user communicates with the service providing server using the terminal, e.g., the PC, via the Internet to complete user registration, device registration for registering a device to be targeted for service, and conclusion of a service contract, in this order.

SUMMARY

For registering a device for concluding the service contract, the device to be registered and a predetermined server communicate with each other via the Internet. Therefore, when the device registration is performed, a situation in which the device to be registered is capable of communicating with the predetermined server via the Internet is needed to be created. In known techniques, the service contract is concluded after the device registration is completed. Therefore, if a situation in which the device is not capable of communicating with the predetermined server via the Internet has occurred after the device registration is completed, the service contract cannot be concluded, which may cause troublesome situation. The present disclosure was made in light of the foregoing circumstances. The present disclosure provides for a technique that enables registration for service although a target device is not capable of performing communication via the Internet.

One illustrative aspect of the disclosure may provide a server comprising: a controller configured to perform: receiving, from a terminal, a registration request for registering a user of a device in a condition where a connection between the server and the device via the Internet has not been established; registering a user ID for identifying the user; receiving, from the terminal, consumable component information related to registration of a service in the condition where the connection between the server and the device via the Internet has not been established, the service being provided by a service providing server and being for use at the device, the consumable component information corresponding to a consumable component selected by the user; registering the consumable component information; receiving, from the device, a device ID for identifying the device after registering the user ID and the consumable component information, and after the connection between the server and the device via the Internet has been established for the first time; registering the device ID in association with the user ID; receiving, from the device, the device ID and related information related to the service after registering the device ID; and communicating with the service providing server using the user ID and the consumable component information.

According to the above-described configuration of the present disclosure, the user ID and the service information may be registered under a situation in which the device is not capable of performing communication via the Internet. If the registration of the user ID and the service information is completed, the registration for service may be allowed to be performed. Therefore, under the situation in which the device is not capable of performing communication via the Internet, the service contract may be concluded. After the device becomes capable of performing communication via the Internet subsequent to completion of the registration for service, the device registration may be performed. In response to completion of the device registration, a user is allowed to obtain the service.

Another illustrative aspect of the disclosure may provide a non-transitory computer readable medium having computer readable instructions, the computer readable instructions, when executed by a terminal, cause the terminal to perform: receiving an registration ID from a service providing server, the registration ID corresponding to a device selected to purchase; searching for the device connected to a network; receiving a response from the device; transmitting, to a server, a device registration request for requesting to transmit a PIN code after receiving the response from the device, the PIN code being configured to be used for registration of the device at the server; receiving the PIN code from the server; and transmitting the received PIN code to the device.

Another illustrative aspect of the disclosure may provide a function executing device comprising: a controller configured to perform: receiving a search request from a terminal; transmitting a response to the search request to the terminal; receiving a PIN code from the terminal; transmitting, to a server, the received PIN code, the server being configured to register a device ID corresponding to the function executing device after receiving the PIN code from the function executing device; receiving, from the server, information relating to a service which is provided by a service providing server; and transmitting, to the server, related information relating to the service.

The technique disclosed in the specification may be implemented by various approaches, for example, control methods and computer programs for implementing functions of devices or the above-described methods, or computer-readable storage media storing the computer programs.

DETAILED DESCRIPTION

<Configuration of Communication System>

Figure 1:
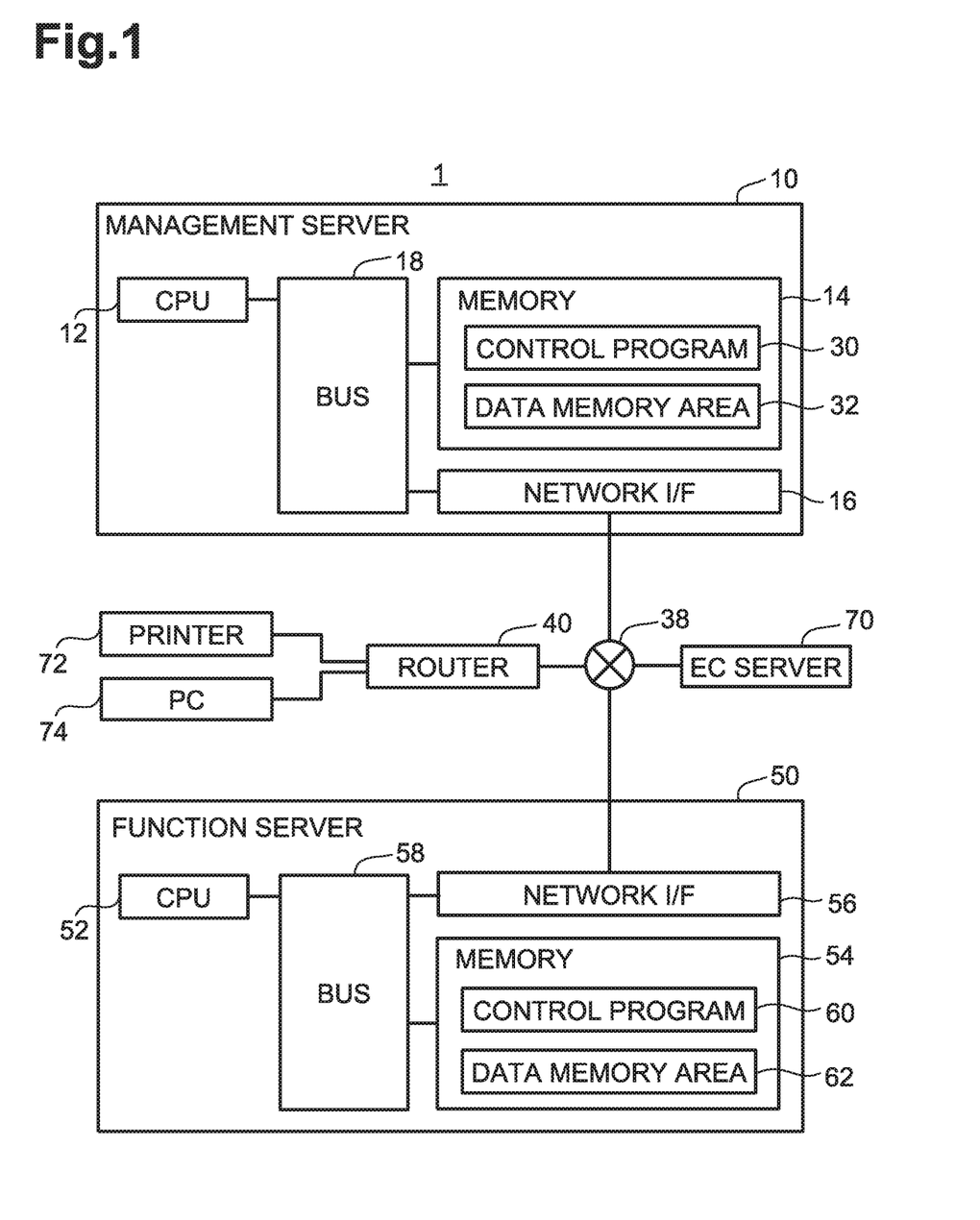
FIG. 1 is a block diagram of a communication system 1.

FIG. 1 is a block diagram of a communication system 1 according to an embodiment of the present application. The communication system 1 includes a management server (as an example of each of a management server and a server of the present disclosure) 10, a function server (as an example of each of a function server and the server of the present disclosure) 50, an electric commerce ("EC") server (as an example of a service providing server of the present disclosure) 70, a printer (as an example of a device of the present disclosure) 72, and a general-purpose personal computer ("PC") (as an example of a terminal) 74. The function server 50 is a separate server from the management server 10.

The management server 10 primarily includes a central processing unit ("CPU") (as an example of a controller of the present disclosure) 12, a memory 14, a network interface ("I/F") 16, which are communicable to each other via a bus 18.

The CPU 12 executes various processing in accordance with a control program (as an example of a control program of the present disclosure) 30 stored in the memory 14. The control program 30 is provided for managing a consumable components delivery service. The memory 14 may include one or a combination of, for example, a random access memory ("RAM"), a read-only memory ("ROM"), a flash memory, a hard disk drive ("HDD"), and a buffer of the CPU 12. The memory 14 includes a data memory area 32. The data memory area 32 is configured to store data necessary for execution of the control program 30.

The network I/F 16 is connected to the Internet 38 and enables the management server 10 to communicate with an external device. The Internet 38 is connected to the function server 50, the EC server 70, and a router 40. The router 40 is further connected to the printer 72 and the PC 74. Thus, the management server 10 is enabled to perform data communication with the function server 50, the EC server 70, the printer 72, and the PC 74 via the network I/F 16.

The function server 50 primarily includes a CPU (as another example of the controller of the present disclosure) 52, a memory 54, a network I/F 56, which are communicable to each other via a bus 58.

The CPU 52 executes various processing in accordance with a control program (as another example of the control program of the present disclosure) 60 stored in the memory 54. The control program 60 is provided for implementing communication involved in the consumable components delivery service. The memory 54 may include one or a combination of, for example, a RAM, a ROM, a flash memory, a HDD, and an a buffer of the CPU 52. The memory 54 includes a data memory area 62. The data memory area 62 is configured to store data necessary for execution of the control program 60.

The network I/F 56 is capable of connecting through the Internet 38 and enables the function server 50 to communicate with an external device. The management server 10, the EC server 70, and the router 40 are capable of connecting through the Internet 38. The router 40 is further connected to the printer 72 and the PC 74. Thus, the function server 50 is enabled to perform data communication with the management server 10, the EC server 70, the printer 72, and the PC 74 via the network I/F 56.

The printer 72 may be an inkjet printer or a laser printer that is an image forming apparatus that may print an image onto a sheet. The PC 74 is a general-purpose computer that may be operated by a user. The router 40 is a relay device that relays communication between one or more client devices that are present on a local network and one or more servers that are present on the Internet 38.

<Consumable Components Ordering Service Using Communication System>

The EC server 70 is configured to accept an order for a device, e.g., the printer 72, and/or an order for one or more consumable components to be used in the device. This configuration may enable the user to order or purchase the printer 72 on the EC server 70 using the PC 74. While the user purchases the printer 72 on the EC server 70, the user may apply for and conclude a contract for an ordering service for consumable components (e.g., one or more ink cartridges for the printer 72). In the ordering service, for example, when a consumable component used in the printer 72 is near the end of its life, an order for the consumable component is automatically placed and the ordered consumable component is delivered to the user from a company that manages the EC server 70. It is noted that, at the time of concluding the contract for the ordering service (i.e., purchase of the printer), the registration of the printer is not executed. The execution of the printer registration occurs after delivering of the printer.

Referring to sequence diagrams of FIGS. 2 to 6, the ordering service for consumable components for the printer 72 will be described in detail. While the consumable components that can be offered in the ordering service for the printer 72 include, for example, toner cartridges of respective colors and drums for laser printers, ink cartridges of respective colors for inkjet printers, and driving force transmission belts used in a mechanism that conveys a printing sheet in a printer, hereinafter, an explanation will be made on an ordering service for ink cartridges of the printer 72. Each processing executed in the management server 10 in the following sequence is executed by the CPU 12 that operates in accordance with the control program 30, and each processing executed in the function server 50 in the following sequence is executed by the CPU 52 that operates in accordance with the control program 60.

More specifically, for example, the user accesses the EC server 70 using the PC 74. A user account for the user (hereinafter, referred to as the "EC server account") is already registered in the EC server 70. Therefore, the user accesses the EC server 70 using the EC server account already registered in the EC server 70. Then, the user proceeds a procedure of ordering (e.g., purchasing) the printer 72 and a procedure of applying for a contract for an ordering service for one or more ink cartridges to be used in the printer 72, on the EC server 70 (e.g., M100) (refer to FIG. 2). In the procedure of applying for the contract for the ordering service, the user enters user information, which may include, for example, a user name, an email address to be used by the user, a delivery address for ink cartridges, and information on payment for the service.

Figure 2:
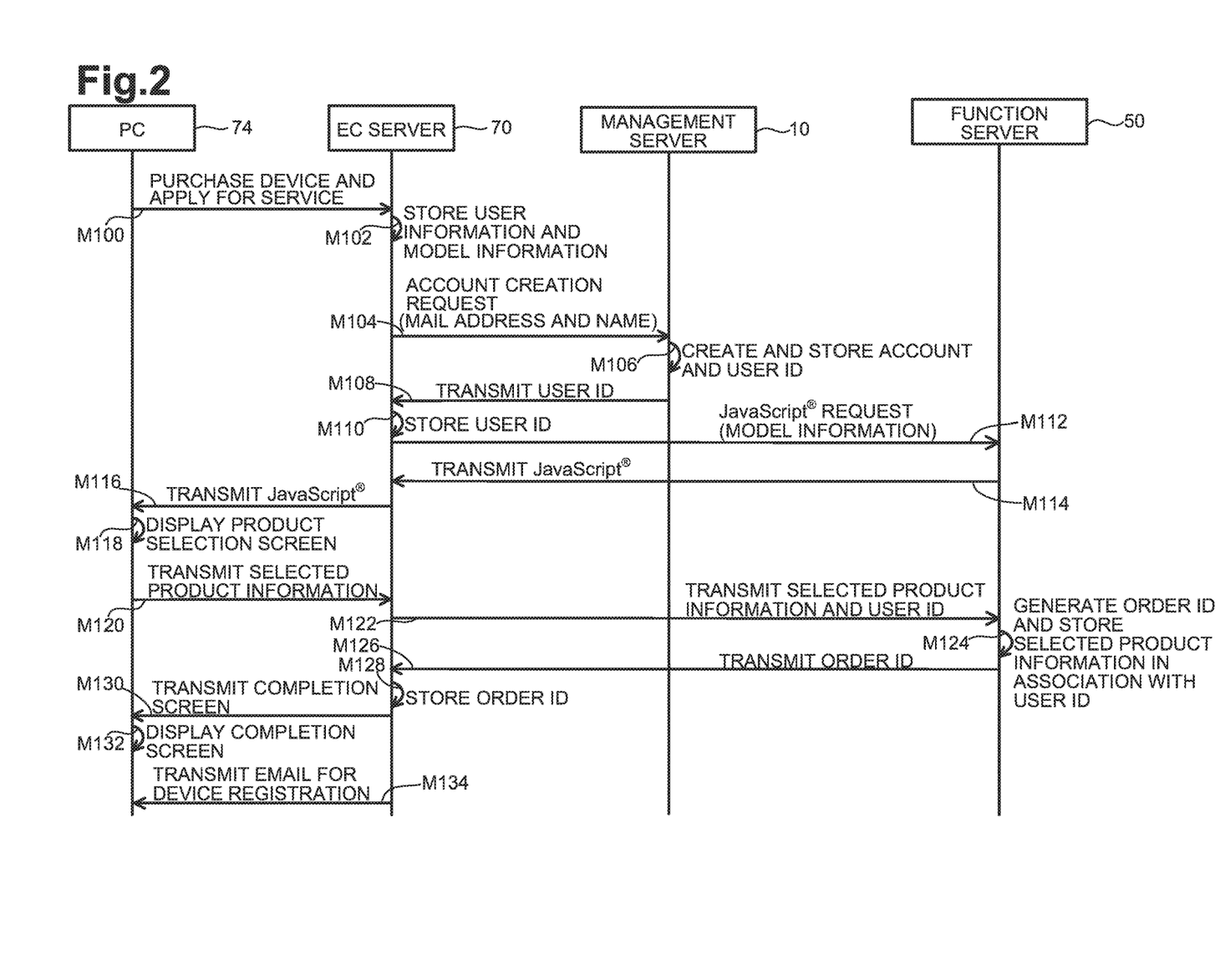
FIG. 2 is an operation sequence diagram for the communication system 1.

Subsequently, the EC server 70 stores model information indicating a model number of the ordered printer 72 and the entered user information in association with the EC server account used when the user accessed the EC server 70 (e.g., M102). The EC server 70 then transmits an account creation request to the management server 10 (e.g., M104). The user name and email address included in the user information are also transmitted to the management server 10 together with the account creation request. In response to receipt of the order for the printer 72 and the request for applying the contract of the ordering service for ink cartridges of the printer 72, the EC server 70 transmits the account creation request. Therefore, transmitting the order for the printer 72 and the request for applying the contract of the ordering service for ink cartridges of the printer 72 also refers to transmitting a user registration request by the PC 74.

In response to receipt of the account creation request, the management server 10 creates an account to be used in the management server 10 (hereinafter, referred to as the "management server account") and a user ID (as an example of a user ID of the present disclosure) and stores the management server account and the user ID in the data memory area 32 in association with each other (e.g., M106). The management server account may be created based on the user name and email address transmitted together with the account creation request. The user ID identifies the user who ordered the printer 72. In this example, the user who ordered the printer 72 is the same as the user of the PC 74. Therefore, the user ID also identifies the user of the PC 74. Subsequently, the management server 10 transmits the created user ID to the EC server 70 (e.g., M108).

In response to receipt of the user ID, the EC server 70 stores the user ID in association with the EC server account as well as the model information stored in M102 (e.g., M110). Subsequently, the EC server 70 transmits a JavaScript® (JavaScript® is a registered trademark owned by Oracle Corporation of Redwood Shores, Calif.) request to the function server 50 (e.g., M112). The model information is also transmitted to the function server 50 together with the JavaScript® request. The function server 50 extracts JavaScript® appropriate for the received model information and transmits the extracted JavaScript® to the EC server 70 (e.g., M114).

The JavaScript® transmitted in M114 enables, for example, the PC 74, to display, on its display, a screen for selecting one or more consumable components to be targeted for the ordering service. Consumable components to be targeted for the ordering service may differ depending on the device models, and therefore, different JavaScript® is required for different device model. Therefore, the function server 50 extracts the JavaScript® appropriate for the received model information and transmits the appropriate JavaScript® to the EC server 70.

In response to receipt of the JavaScript®, the EC server 70 further transmits the JavaScript® to the PC 74 (e.g., M116). In response to this, the PC 74 displays a product selection screen on the display of the PC 74 (e.g., M118). The product selection screen enables the user to select one or more consumable components appropriate for the ordered printer 72, as targets for the ordering service. Then, the user selects and enters one or more consumable components to be targeted for the ordering service, e.g., ink cartridges of respective colors, into the PC 74. In response to this, information on the selected consumable component (hereinafter, referred to as the "selected product information") is transmitted to the EC server 70 from the PC 74 (e.g., M120). The selected product information includes, for example, a model number of the selected consumable component. The selected product information may also be referred to as information on registration for the consumable component ordering service.

In response to receipt of the selected product information, the EC server 70 transmits the received selected product information and the user ID stored in M110, to the function server 50 (e.g., M122). In response to receipt of the selected product information and the user ID, the function server 50 generates an order ID (as an example of a registration ID of the present disclosure) and associates the selected product information, EC server information, and the order ID with each other. The EC server information identifies the EC server 70 that has transmitted the selected product information. In the embodiment, the selected product information is received on an individual color basis. Subsequently, the function server 50 stores the order ID and the received user ID in the data memory area 62 in association with each other (e.g., M124).

Subsequently, the function server 50 transmits the order ID to the EC server 70 (e.g., M126). In response to receipt of the order ID, the EC server 70 stores the received order ID in association with the EC server account. At that time, the EC server 70 also associates the already-stored model information and user information with the EC server account (e.g., M128). Then, the EC server 70 transmits, to the PC 74, a completion screen representing that the contract for the ordering service has been concluded (e.g., M130). In response to receipt of the completion screen, the PC 74 displays the completion screen on the display of the PC 74 (e.g., M132). Further, the EC server 70 transmits an email for device registration to the email address included in the user information. In this example, the PC 74 receives the email for device registration (e.g., M134). The email for device registration includes a link for accessing a predetermined website on the EC server. The registration of the printer 72 is performed using the link included in the email.

While the processing of each of M100 to M134 is executed, the printer 72 is not being connected to the router 40 because the printer 72 ordered on the EC server 70 has not been delivered to the user yet. Thus, the printer 72 is not capable of communicating with the management server 10 via the Internet 38.

Figure 3:
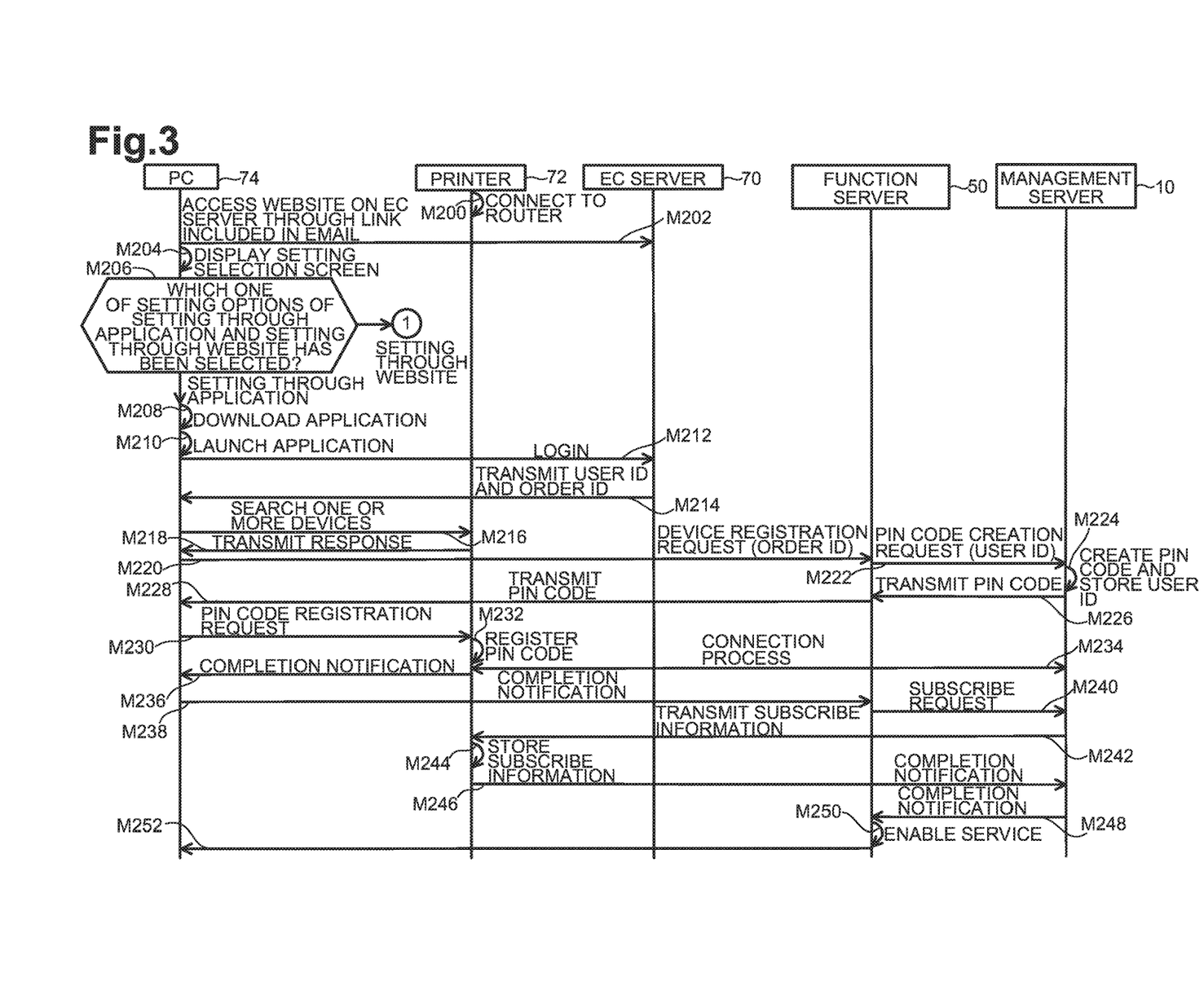
FIG. 3 is an operation sequence diagram for the communication system 1.

After the printer 72 is delivered to the user, the user connects the printer 72 to the router 40 (e.g., M200) (refer to FIG. 3). Thus, the printer 72 becomes enabled to communicate with an external device connected to the local network, e.g., a wireless local area network ("LAN") or wired LAN, i.e., the external device connected to the PC 74 and the Internet 38. That is, the printer 72 becomes capable of communicating with the management server 10. In other words, the status of the printer 72 changes from an uncommunicable status in which the printer 72 is not capable of communicating with the management server 10 via the Internet 38 to a communicable status in which the printer 72 is capable of communicating with the management server 10 via the Internet 38. Subsequently, the user accesses the predetermined website on the EC server 70 using the PC 74 through the link included in the email for device registration received in M134 (e.g., M202).

In response to access to the predetermined website on the EC server 70 using the link included in the email for device registration, the PC 74 displays a registration screen for registering a purchased device for the ordering service (corresponding to a setting selection screen of FIG. 3) on the display of the PC 74 (e.g., M204). The registration screen includes a "setting through application" button and a "setting through website" button. The "setting through application" button may be selected for registering a device through an application. The "setting through website" button may be selected for registering a device through a website of the EC server 70. In response to input of an operation for selecting the "setting through application" button (e.g., M206: SETTING THROUGH APPLICATION) on the registration screen, the PC 74 is allowed to access the predetermined website. In response to this, the PC 74 displays a screen for enabling the PC 74 to download a predetermined application on the display of the PC 74. Then, the PC 74 downloads the predetermined application through the screen (e.g., M208) and launches the downloaded application (e.g., M210).

In response to launching of the application, the application attempts to log in to the EC server 70 using the EC server account (e.g., M212). In response to success in the login, the EC server 70 extracts the user ID and the order ID both stored in association with the EC server account used for login, and transmits the extracted user ID and order ID to the PC 74 (e.g., M214). Subsequently, the application of the PC 74 searches one or more devices connected to the local network (e.g., M216). The printer 72 is thus found by the application of the PC 74. In reply to the device search executed by the application of the PC 74, the printer 72 transmits a response to the PC 74 (e.g., M218). Therefore, the PC 74 recognizes that the printer 72 is being connected to the local network.

Subsequently, the PC 74 transmits a device registration request to the function server 50 (e.g., M220). At that time, the order ID received in M214 is also transmitted together with the device registration request. The function server 50 extracts the user ID stored in association with the received order ID, and transmits a PIN code (as an example of a PIN code of the present disclosure) creation request to the management server 10 together with the user ID (e.g., M222). In response to receipt of the PIN code creation request, the management server 10 creates a PIN code and stores the PIN code in the data memory area 32 in association with the user ID received in M222 (e.g., M224).

Subsequently, the management server 10 transmits the PIN code to the function server 50 (e.g., M226), and the function server 50 further transmits the received PIN code to the PC 74 (e.g., M228). In response to receipt of the PIN code, the application of the PC 74 transmits a PIN code registration request to the printer 72 (e.g., M230). Thus, the printer 72 registers the received PIN code (e.g., M232). Then, a connection process is performed between the printer 72 in which the PIN code has been registered and the management server 10.

Figure 4:
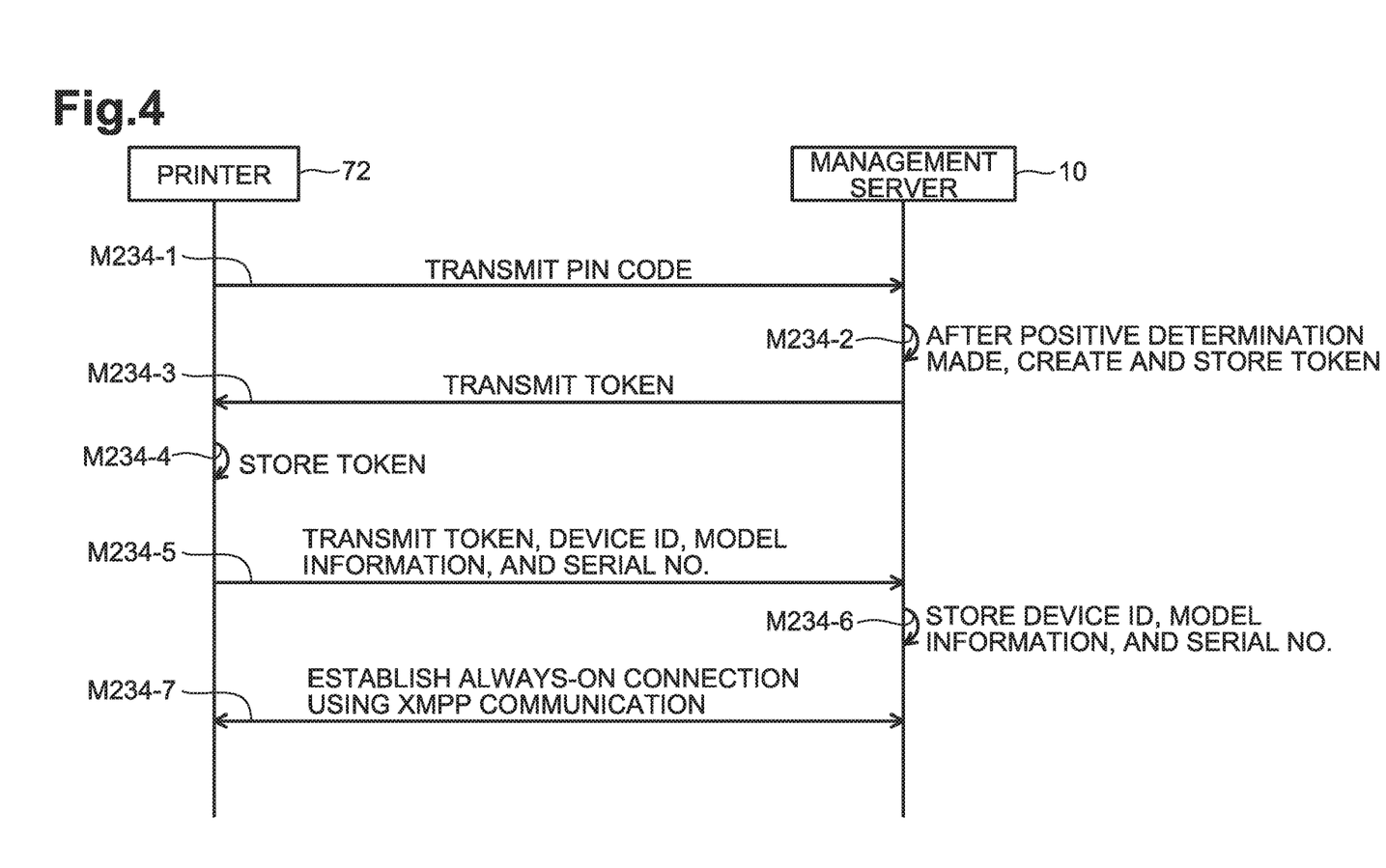
FIG. 4 is an operation sequence diagram for the communication system 1.

In the connection process performed between the printer 72 and the management server 10, the printer 72 transmits the PIN code, which has been registered in the printer 72, to the management server 10 (e.g., M234-1) (refer to FIG. 4). In response to receipt of the PIN code, the management server 10 determines whether the received PIN code matches with the PIN code stored in M224. When the received PIN code matches with the PIN code stored in M224, the management server 10 creates a token. The management server 10 then extracts the user ID stored in association with the PIN code, and stores the created token in the data memory area 32 in association with the extracted user ID (e.g., M234-2).

Subsequently, the management server 10 transmits the token to the printer 72 (e.g., M234-3), and the printer 72 stores the received token (e.g., M234-4). The printer 72 then transmits a device ID (as an example of a device ID of the present disclosure) identifying the printer 72, the model information, and a serial No. to the management server 10 (e.g., M234-5). In response to receipt of the token, the device ID, the model information, and the serial No., the management server 10 extracts the user ID associated to the received token and stores the received device ID, the model information, and the serial No. in the data memory area 32 in association with the extracted user ID (e.g., M234-6). Then, an always-on connection using extensible messaging and presence protocol ("XMPP") communication is established between the printer 72 and the management server 10 (e.g., M234-7). Thus, the connection process (e.g., M234) between the printer 72 and the management server 10 is completed.

In response to completion of the connection process between the printer 72 and the management server 10, the printer 72 transmits, to the PC 74, a completion notification that the connection process has been completed (e.g., M236) (refer to FIG. 3). The completion notification includes the device ID of the printer 72. The PC 74 then transmits a completion notification including the device ID of the printer 72 to the function server 50 (e.g., M238). In response to receipt of the completion notification, the function server 50 registers the device ID included in the completion notification in association with the user ID, the selected product information, and the EC server information, and transmits a subscribe request to the management server 10 (e.g., M240). In response to this, the management server 10 transmits subscribe information to the printer 72 (e.g., M242). The subscribe information includes an instruction for executing predetermined processing periodically. More specifically, for example, the subscribe information may include an instruction for causing the printer 72 to detect a remaining life of a target, e.g., every 12 hours, and transmit remaining life information indicating the detected remaining life of the target to the management server 10. The remaining information may indicate, for example, an amount of ink remaining in an ink cartridge.

In response to receipt of the subscribe information, the printer 72 stores the subscribe information (e.g., M244). Subsequently, the printer 72 transmits, to the management server 10, a completion notification that storing of the subscribe information has been completed (e.g., M246), and the management server 10 further transmits the completion notification to the function server 50 (e.g., M248). In response to receipt of the completion notification, the function server 50 enables the ordering service for the printer 72 (e.g., M250). In response to enabling the ordering service, the ordering service starts. In response to enabling the ordering service in the function server 50, the function server 50 transmits a completion notification to the PC 74 (e.g., M252). In response to receipt of the completion notification from the function server 50, the user recognizes that the registration of the printer 72 for the ordering service has been completed and the ordering service for the printer 72 has started.

In response to input of an operation for selecting the "setting through website" button on the registration screen in M206 (e.g., M206: SETTING THROUGH WEBSITE) (refer to FIG. 3), the PC 74 displays a login screen on the display of the PC 74 (e.g., M260) (refer to FIG. 5). In response to this, the user attempts to log in to the EC server 70 by entering the EC server account on the login screen (e.g., M261). In response to success in the login, the EC server 70 extracts the order ID stored in association with the EC server account used for login, and transmits the order ID to the function server 50 together with a device registration request (e.g., M262).

Figure 5:
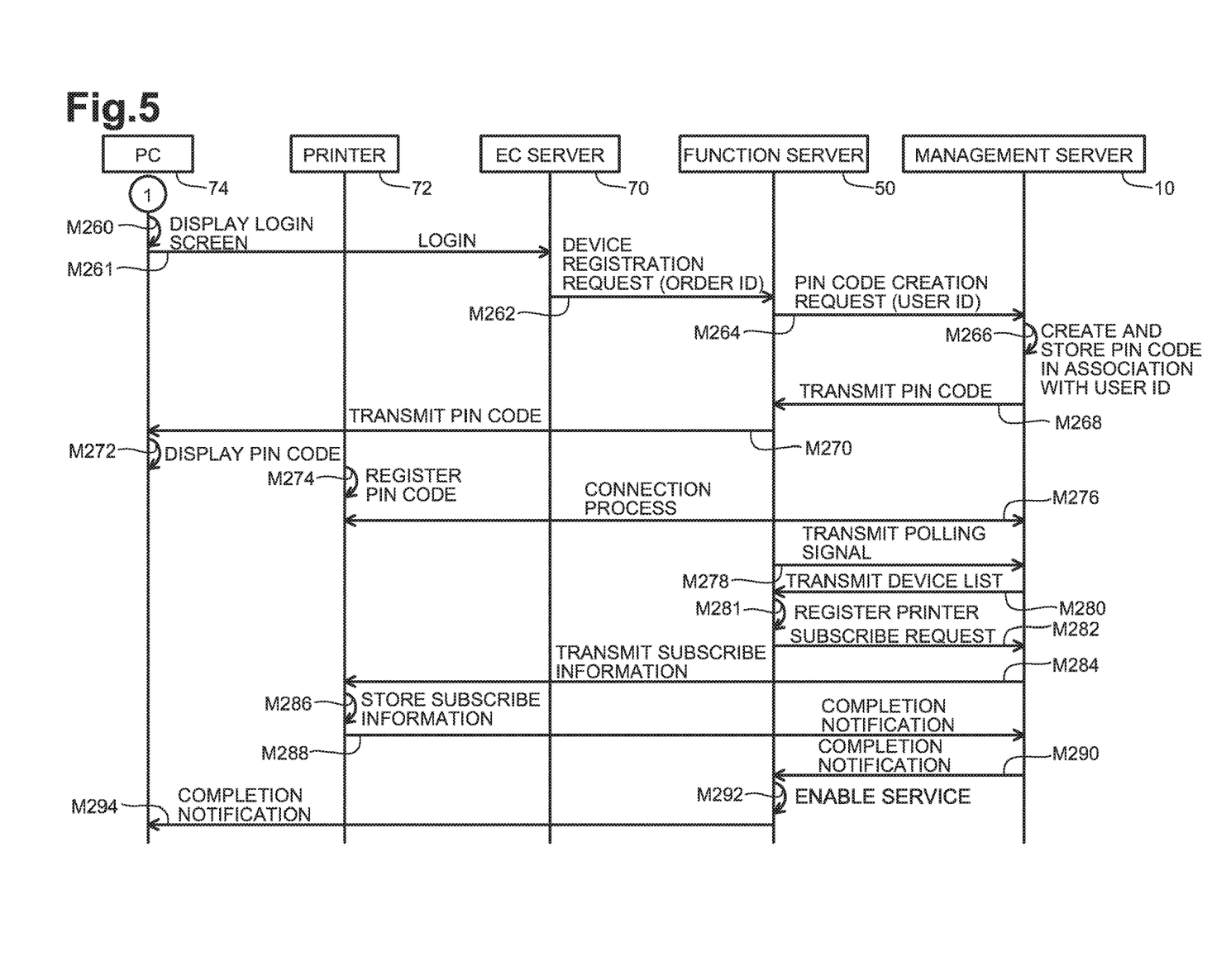
FIG. 5 is an operation sequence diagram for the communication system 1.

The function server 50 extracts the user ID stored in association with the received order ID, and transmits a PIN code creation request to the management server 10 together with the user ID (e.g., M264). In response to receipt of the PIN code creation request, the management server 10 creates a PIN code and stores the PIN code in the data memory area 32 in association with the user ID received in M264 (e.g., M266). Subsequently, the management server 10 transmits the PIN code to the function server 50 (e.g., M268), and the function server 50 further transmits the received PIN code to the PC 74 (e.g., M270).

In response to receipt of the PIN code, the PC 74 displays the PIN code on the display (e.g., M272). In response to this, the user confirms the PIN code and enters the PIN code into the printer 72 by operating an operation panel of the printer 72. Thus, the PIN code is registered in the printer 72 (e.g., M274). In response to this, a connection process is executed between the printer 72 and the management server 10 (e.g., M276). The connection process executed in M276 is the same or similar to the connection process executed in M234, and therefore, the detailed description of the connection process executed in M276 is omitted.

After transmitting the PIN code to the PC 74, the function server 50 periodically transmits, to the management server 10, the user ID and a polling signal for obtaining a device list associated with the user ID (e.g., M278), and receives a device list from the management server 10 periodically in reply to the transmission of each polling signal (e.g., M280). The device list includes the device ID associated with the user ID. In a case where a new device ID (e.g., the device ID of the printer 72) has been registered in association with the user ID in the management server 10 as a result of the processing of M276, the function server 50 determines that the received device list includes a new printer (e.g., the printer 72) and thus registers the new device ID in association with the user ID, the selected product information, and the EC server information (e.g., M281). Thereafter, processing of each of M282 to M294 is executed. Processing executed in each of M282 to M294 is the same or similar to the processing executed in each of M240 to M252, respectively, and therefore, the detailed description of the common steps is omitted. Upon completion of the processing of M294, the registration of the printer 72 for the ordering service is completed and the ordering service for the printer 72 starts.

Figure 6:
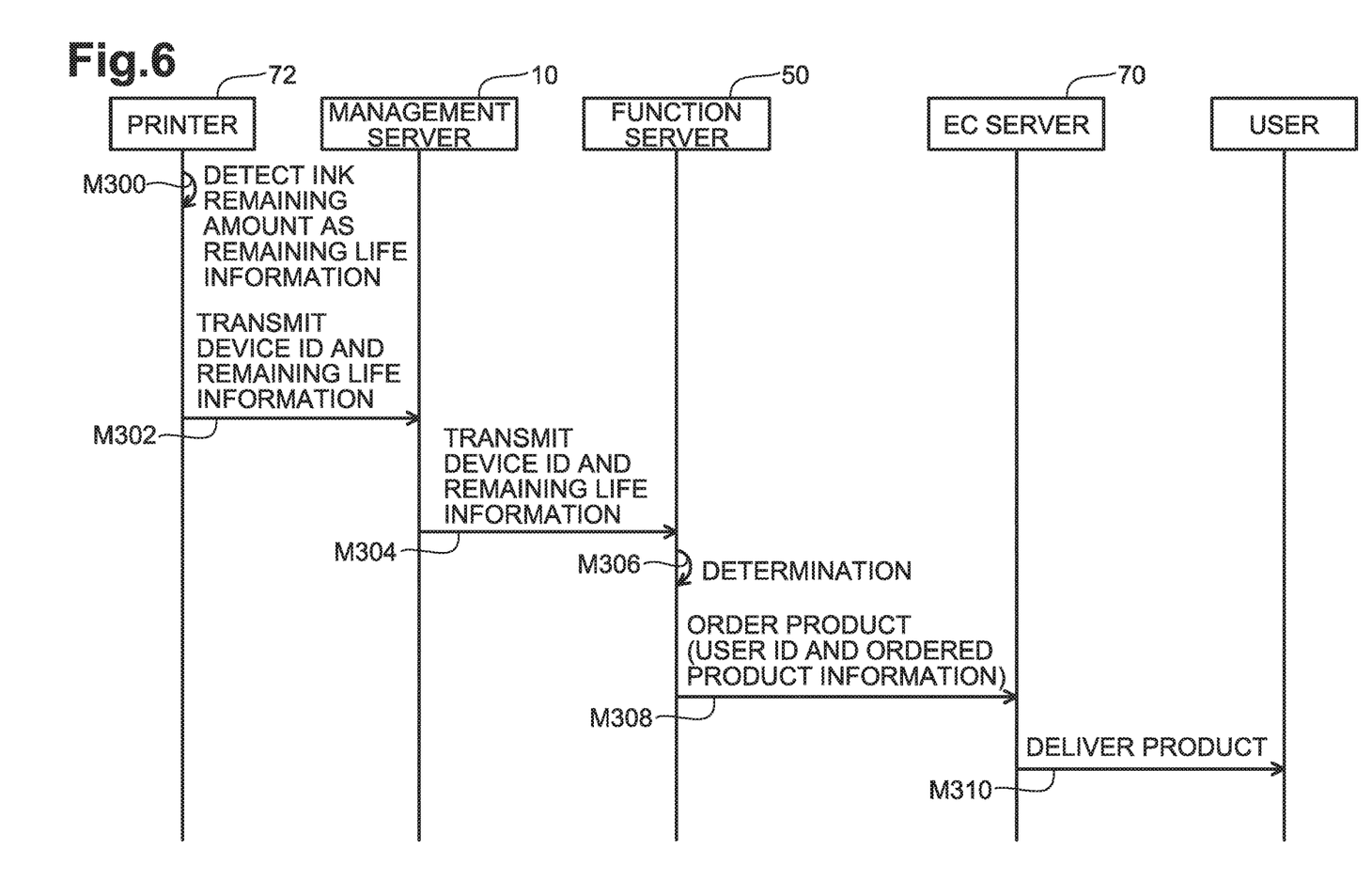
FIG. 6 is an operation sequence diagram for the communication system 1.

Upon start of the ordering service for the printer 72, the printer 72 detects a remaining amount of each ink cartridge periodically (as an example of related information of the present disclosure) as remaining life information of each ink cartridge. A plurality of ink cartridges of respective colors are installed in the printer 72 so as to be detachably attachable, and the printer 72 includes detection sensors for the respective ink cartridges. Each of the detection sensors is configured to detect whether a remaining amount of ink in a corresponding ink cartridge is lower than or equal to a first threshold and lower than or equal to a second threshold, which is smaller than the first threshold. When the detection sensor detects that the remaining amount of ink in the corresponding ink cartridge is lower than or equal to the first threshold but greater than the second threshold, the ink remaining amount of the ink cartridge is determined as "Near Empty". When the detection sensor detects that the remaining amount of ink in the corresponding ink cartridge is lower than or equal to the second threshold, the ink remaining amount of the ink cartridge is determined as "Empty". When the detection sensor detects that the remaining amount of ink in the corresponding ink cartridge is greater than the first threshold, the ink remaining amount of the ink cartridge is determined as "Full". Thus, the status of the determined ink remaining amount (hereinafter, referred to as "ink remaining amount status") is determined as one of "Near Empty", "Empty", and "Full". In the printer 72, an amount of used ink is estimated based on the number of sheets that have been printed and an ink remaining amount is further estimated based on the estimated amount of used ink (hereinafter, referred to as the "estimated ink remaining amount"). Therefore, the printer 72 periodically detects the ink remaining amount status and the estimated ink remaining amount, as remaining life information (e.g., M300). Then, the printer 72 transmits the remaining life information to the management server 10 (e.g., M302). Both of the ink remaining amount status and the estimated ink remaining amount are detected on an ink cartridge basis. Therefore, the remaining life information of each ink cartridge is transmitted in association with respective color information.

In response to receipt of each pieces of remaining life information together with the device ID, the management server 10 further transmits each pieces of remaining life information together with the device ID to the function server 50 (e.g., M304). In response to receipt of each pieces of remaining life information together with the device ID, the function server 50 determines for each color whether selected product information is associated to the received device ID. When the function server 50 determines that selected product information is associated to the received device ID for any color, the function server 50 further determines, based on the corresponding received remaining life information, whether the ink cartridge indicated by the selected product information needs to be replaced with a new one (e.g., M306).

When the function server 50 determines that the ink cartridge needs to be replaced with a new one, the function server 50 transmits the serial number of the ink cartridge indicated by the selected product information used in the determination in M306, to the EC server 70 identified by the EC server information, as ordered product information (e.g., M308). Thus, an order for the ink cartridge with a relatively low ink is placed automatically. In a case where two or more ink cartridges need to be replaced with respective new ones, an order for the two or more ink cartridges is automatically placed. The function server 50 transmits the user ID to the EC server 70 together with the ordered product information. In response to receipt of the ordered product information and the user ID, the EC server 70 extracts the user information associated to the received user ID. Then, for example, the company that manages the EC server dispatches the ink cartridge with the model number based on the received ordered product information (e.g., M310). Therefore, the user may receive a new ink cartridge assigned with the model number that the user selected when applying for the service, without concern for the remaining life of the ink cartridge or without ordering the ink cartridge by him/herself.

As described above, in the communication system 1, the contract for the ordering service is applied and concluded when a device, e.g., the printer 72, is ordered or purchased. After the ordered device is delivered to the user, the device is registered for the ordering service. For registering the device for the ordering service, the user is enabled to access the website for registering the device using the link included in the email transmitted from the EC server 70, and register the device by entering necessary information in accordance with instructions provided through the website.

In some known system, the device registration needs to be completed before a contract for such an ordering service is applied and concluded. Therefore, some users who may be unfamiliar to operation of terminals, e.g., PCs, may give up applying for and concluding a contract for the service. On the other hand, in the communication system 1, the user may be enabled to apply for and conclude the contract for the service without the physical possession of the ordered device on user site. In other words, the user may be enabled to conclude the contract for the service without registering the ordered device. In the embodiment, the description has been made on the case where the user orders or purchases a device on the EC server 70. Nevertheless, in other embodiments, for example, the user may purchase a device at a mortar and brick store. In this case, the user may be enabled to apply for and conclude the contract for ordering service when purchasing the device at the store. In this case, in one example, on behalf of the user, a staff member of the store may apply for and conclude the contract for ordering service at the store. In another example, the user may apply for and conclude the contract for ordering service at the store with an assistance of the staff member of the store. By doing so, users who may be unfamiliar to operation of terminals, e.g., PCs, may be enabled to conclude the contract for ordering service with less stress.

The present disclosure is not limited to the embodiment described above, and various changes, arrangements and modifications may be applied therein. In the above-described embodiment, the management server 10 and the function server 50 are independent web servers, respectively. Nevertheless, in other embodiments, for example, the management server 10 and the function server 50 may consist of a single web server.

In the above-described embodiment, the selected product information is registered subsequent to registration of the user ID. Nevertheless, in other embodiments, for example, the selected product information may be registered prior to registration of the user ID.

In the above-described embodiment, the contract for the ordering service is concluded at the time of ordering or purchasing a device (i.e., prior to the user receiving the ordered device). Nevertheless, in other embodiments, for example, the contract for the ordering service may be concluded after the user received the ordered device but before the user connects the device to the Internet.

In the above-described embodiment, the target components for the ordering service are replaceable components for printers. Nevertheless, in other embodiments, for example, the target components for the ordering service may be consumable components for other devices, e.g., facsimile machines, sewing machines, or label printers. That is, the target components for the ordering service may include, for example, ink ribbons, threads, and tape cartridges. In other embodiments, for example, another service, for example, service for executing special image processing relating to scanning or printing on a service providing server may be provided.

In the above-described embodiment, the function server 50 confirms the completion of the registration of the printer 72 by signal transmission and reception between the management server 10 and the function server 50 through M248 to M281. Nevertheless, in other embodiments, for example, the function server 50 may confirm the completion of the registration of the printer 72 by a notification provided by the PC 74. More specifically, for example, the screen showing a PIN code may include a "complete" button, and a message that prompts the user to select or operate the "complete" button after completing entry of the PIN code into the printer 72. The message is added to the "complete" button. Therefore, after the user completed the entry of the PIN code into the printer 72, the user may select or operate the "complete" button. In response to this, the PC 74 may transmit a completion notification to the function server 50. Thus, the function server 50 may confirm the completion of the registration of the printer 72.

In the above-described embodiments, the processing in all steps illustrated in FIGS. 2 to 6 is implemented by the CPU 12 or the CPU 52. Nevertheless, in other embodiments, for example, the processing in at least one of the steps illustrated in FIGS. 2 to 6 may be implemented by hardware, for example, one or more special application specific integrated circuits ("ASICs") or one or more other logical circuits, or a combination of one or more CPUs, one or more ASICs, and one or more other logical circuits.

What is claimed is:

1. A server system comprising:
a management server comprising a first processor and a first memory storing a first set of instructions executable by the first processor;
a function server comprising a second processor and a second memory storing a second set of instructions executable by the second processor;
a combination of the management server and the function server configured to perform:
receiving a registration request for registering a user of a device in a condition where a connection between the server system and the device via the Internet has not been established;
registering a user ID for identifying the user;
receiving, from a terminal, consumable component information related to registration of a service in the condition where the connection between the server system and the device via the Internet has not been established, the service being provided by a service providing server and being for use at the device, the consumable component information corresponding to a consumable component selected by the user;
registering the consumable component information;
after registering the consumable component information, transmitting a notification to the service providing server to cause the service providing server to send an email to the terminal, the email including a link that enables the terminal to transmit a device registering request to the server system;
after transmission of the email, receiving, from terminal the device registering request;
in response to receiving the device registering request, transmitting, to the terminal, a PIN code;
in response to the PIN code being registered into the device, receiving, from the device, a device ID for identifying the device after registering the user ID and the consumable component information, and after the connection between the server system and the device via the Internet has been established for the first time;
registering the device ID in association with the user ID;
receiving, from the device, the device ID and related information related to the service after registering the device ID; and
communicating with the service providing server using the user ID and the consumable component information.

2. The server system according to claim 1,
wherein the link is for accessing a specific website, and the device registering request is received after the specific website is accessed using the link at the terminal, an application program is received at the terminal, the received application program is executed at the terminal and the device is searched at the terminal device using the application program, the device being configured to receive the PIN code from the terminal;

after receiving the PIN code from the device, the device ID is registered in association with the user ID.

3. The server system according to claim 1, wherein the combination of the management server and the function server is further configured to perform:
receiving a transmission request for requesting a PIN code from the service providing server after (1) the user ID and the consumable component information are registered, (2) the mail including a link for accessing the service providing server is transmitted from the service providing server and (3) the service providing server is accessed using the link at the terminal; and
transmitting the PIN code to the terminal,
after receiving the PIN code from the device, the device ID is registered in association with the user ID.

4. The server system according to claim 1, wherein the first processor in the management server is configured to perform:
the receiving, from the terminal, the registration request via the service providing server;
creating the user ID;
the registering the user ID;
the registering the device ID; and
the receiving the device ID and the related information after registering the device ID,
the second processor in the function server is configured to perform:
the receiving, from the terminal, the consumable component information via the service providing server;
the registering the consumable component information; and
the communicating with the service providing server.

5. The server system according to claim 4, wherein the second processor in the function server registers the consumable component information after the first processor in the management server registers the user ID.

6. The server system according to claim 4, wherein the second processor in the function server is further configured to perform:
associating a registration ID and the user ID with each other in the second memory of the function server;
receiving the device registering request including the registration ID after the connection between the function server and the device via the Internet has been established for the first time; and
transmitting, to the management server, the user ID,
the first processor in the management server is further configured to perform:
receiving the user ID from the function server;
associating the user ID and the PIN code with each other in the first memory of the management server;
transmitting the PIN code to the function server; and
associating the device ID with the user ID in the first memory of the management server, the user ID being associated with the PIN code.

7. The server system according to claim 1, wherein the registration request and the consumable component information are received after an instruction for purchase the device is issued to the service providing server.

8. The server system according to claim 1, wherein the service includes a delivering service for delivering the consumable component,
the related information includes information representing a remaining life of the consumable component, and
the server system transmits a delivering request, to the service providing server, for requesting to deliver the consumable component.

9. The server system according to claim 8, wherein the combination of the management server and the function server is further configured to perform:
determining whether the consumable component needs to be replaced based on the information representing the remaining life of the consumable component; and
transmitting, to the service providing server, order information for requesting to deliver the consumable component in a case where it is determined that the consumable component needs to be replaced.

10. The server system according to claim 1, wherein the combination of the management server and the function server is further configured to perform:
receiving a request including model information indicating a model of the device;
extracting target information appropriate for the received model information; and
transmitting, to the service providing server, the target information, the target information being configured to be used to display a selection screen on a display unit of the terminal after the target information is transmitted to the terminal, the selection screen being used for selecting the consumable component by the user.

11. A non-transitory computer readable medium storing instructions, the instructions, executed by a management server and a function server, configured to perform:
receiving a registration request for registering a user of a device in a condition where a connection between the management server or the function server and the device via the Internet has not been established;
registering a user ID for identifying the user;
receiving, from a terminal, consumable component information related to registration of a service in the condition where the connection between the management server or the function server and the device via the Internet has not been established, the service being provided by a service providing server and being for use at the device, the consumable component information corresponding to a consumable component selected by the user;
registering the consumable component information;
after registering the consumable component information, transmitting a notification to the service providing server to cause the service providing server to send an email to the terminal, the email including a link that enables the terminal to transmit a device registering request to the function server;
after transmission of the email, receiving, from the terminal the device registering request;
in response to receiving the device registering request, transmitting, to the terminal, a PIN code
in response to the PIN code being registered into the device, receiving, from the device, a device ID for identifying the device after registering the user ID and the consumable component information, and after the connection between the management server or the function server and the device via the Internet has been established for the first time;
registering the device ID in association with the user ID;
receiving, from the device, the device ID and related information related to the service after registering the device ID; and communicating with the service providing server using the user ID and the consumable component information.

12. A server comprising:
a storage; and
a controller configured to:
- receive a registration request for registering a user of a device in a condition where a connection between the server and the device via the Internet has not been established;
- register a user ID for identifying the user in the storage;
- receive, from a terminal, consumable component information related to registration of a service in the condition where the connection between the server and the device via the Internet has not been established, the service being provided by a service providing server and being for use at the device, the consumable component information corresponding to a consumable component selected by the user;
- register the consumable component information in the storage;
- after registering the consumable component information, transmitting a notification to the service providing server to cause the service providing server to send an email to the terminal, the email including a link that enables the terminal to transmit a device registering request to the server;
- after transmission of the email, receiving, from the terminal the device registering request;
- in response to receiving the device registering request, transmit, to the terminal, a PIN code;
- in response to the PIN code being registered into the device, receive, from the device, a device ID for identifying the device after registering the user ID and the consumable component information, and after the connection between the server and the device via the Internet has been established for the first time;
- register the device ID in association with the user ID in the storage;
- receive, from the device, the device ID and related information related to the service after registering the device ID; and
- communicate with the service providing server using the user ID and the consumable component information.

13. A non-transitory computer readable medium storing instructions, the instructions, executed by a server, configured to perform:
- receiving a registration request for registering a user of a device in a condition where a connection between the server and the device via the Internet has not been established;
- registering a user ID for identifying the user;
- receiving, from a terminal, consumable component information related to registration of a service in the condition where the connection between the server and the device via the Internet has not been established, the service being provided by a service providing server and being for use at the device, the consumable component information corresponding to a consumable component selected by the user;
- registering the consumable component information;
- after registering the consumable component information, transmitting a notification to the service providing server to cause the service providing server to send an email to the terminal, the email including a link that enables the terminal to transmit a device registering request to the server;
- after transmission of the email, receiving, from the terminal the device registering request;
- in response to receiving the device registering request, transmitting, to the terminal, a PIN code;
- in response to the PIN code being registered into the device,
- receiving, from the device, a device ID for identifying the device after registering the user ID and the consumable component information, and after the connection between the server and the device via the Internet has been established for the first time;
- registering the device ID in association with the user ID;
- receiving, from the device, the device ID and related information related to the service after registering the device ID; and
- communicating with the service providing server using the user ID and the consumable component information.

* * * * *

UNITED STATES PATENT AND TRADEMARK OFFICE
CERTIFICATE OF CORRECTION

PATENT NO. : 11,379,701 B2
APPLICATION NO. : 15/798636
DATED : July 5, 2022
INVENTOR(S) : Takeshi Nagasaki It is certified that error appears in the above-identified patent and that said Letters Patent is hereby corrected as shown below:

In the Claims

Column 12, Claim 1, Lines 40-41 should read:
after transmission of the email, receiving, from the terminal, the device registering request;

Column 13, Claim 7, Line 60 should read:
chasing the device is issued to the service providing Column 14, Claim 11, Line 54 should read:
minal, the device registering request;

Column 15, Claim 12, Line 30 should read:
terminal, the device registering request;

Column 16, Claim 13, Line 27 should read:
minal, the device registering request;

Signed and Sealed this
Twenty-fourth Day of January, 2023

Katherine Kelly Vidal
*Director of the United States Patent and Trademark Office*